United States Patent
Schmitz

(10) Patent No.: US 6,680,941 B1
(45) Date of Patent: Jan. 20, 2004

(54) PROCESS, SOFTWARE MODULE, INTERFACE, TERMINAL DEVICE, AND SERVER FOR THE CONTROL OF THE FORWARDING OF PACKETS FROM COMPLETED PACKET SEQUENCES OF PACKET-SWITCHED NETWORKS

(75) Inventor: Bernhard Schmitz, Renningen-Malmsheim (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/306,637

(22) Filed: May 7, 1999

(30) Foreign Application Priority Data

May 8, 1998 (DE) .......................................... 198 20 525

(51) Int. Cl.$^7$ ............................................... H04L 12/56
(52) U.S. Cl. .................... 370/392; 370/394; 370/401; 370/409; 370/415; 370/471
(58) Field of Search ................................ 370/389, 394, 370/395.1, 470, 471, 474, 391, 392, 401, 409, 410, 415

(56) References Cited

U.S. PATENT DOCUMENTS

| | | | |
|---|---|---|---|
| 4,910,777 A | | 3/1990 | Larson et al. |
| 5,485,453 A | * | 1/1996 | Wahlman et al. ......... 340/2.23 |
| 5,790,554 A | * | 8/1998 | Pitcher et al. ............. 370/389 |
| 5,933,412 A | * | 8/1999 | Choudhury et al. ........ 370/218 |
| 5,991,299 A | * | 11/1999 | Radogna et al. ........... 370/389 |
| 6,148,000 A | * | 11/2000 | Feldman et al. ........... 370/394 |

FOREIGN PATENT DOCUMENTS

| | | |
|---|---|---|
| DE | 197 36 515 A1 | 3/1998 |
| DE | 197 07 061 A1 | 8/1998 |
| EP | 0 892 575 A2 | 1/1999 |
| JP | 9-252323 | 9/1997 |
| JP | 9-312642 | 12/1997 |

OTHER PUBLICATIONS

IBM Technical Disclosure Bulletin, vol. 40, No. 12, Dec. 1997.

Pietro Schicker, Datenubertragung und Rechnernetze, Stuttgart, 1988, Kap. 5.1–5.5, S. 115–136.

* cited by examiner

*Primary Examiner*—Dang Ton
*Assistant Examiner*—Inder Pal Mehra
(74) *Attorney, Agent, or Firm*—Sughrue Mion, PLLC

(57) ABSTRACT

A process for the control of forwarding packets of completed packet sequences of packet-switched networks as well as a software module, an interface, a terminal device, and a server for this purpose. In these packets of packet sequences, information is transported segmentally. First, that the authorization of a packet to be forwarded is tested by using the transported information of the packet by way of comparison with a certain criterion, at least whenever the packet belongs at the start of a packet sequence (C11A, C12A, C13A). Second, that successive packets of a packet sequence except the initial packet are required to be tested before being forwarded up until the transported information has been made completely available and is comparable with the criterion, and, last, that a packet of a packet sequence is forwarded if it could be determined when subjected to comparison that forwarding the packet is allowed or if it has already been determined by testing a previous packet of the same packet sequence that forwarding the packet of this packet sequence is allowed.

8 Claims, 2 Drawing Sheets

PROCESS, SOFTWARE MODULE, INTERFACE, TERMINAL DEVICE, AND SERVER FOR THE CONTROL OF THE FORWARDING OF PACKETS FROM COMPLETED PACKET SEQUENCES OF PACKET-SWITCHED NETWORKS

This application is based on and claims the benefit of German Patent Application No. 198 20525.2 filed May 8, 1998, which is incorporated by reference herein.

BACKGROUND OF THE INVENTION

The present invention concerns a process for the control of forwarding packets from completed packet sequences of packet-switched networks, to a software module for such control, and to an interface, a terminal device and a server for this purpose.

The increasing network interconnection of computers between each other to computer networks in local areas through so-called Local Area Networks (LAN), in broad traffic through so-called Wide Area Networks (WAN) as well as world wide through ATM Networks (Asynchronous Transfer Mode) and over the Internet allows the exchange of the computers' data between each other to an ever increasing extent. Data is exchanged in data packets on the aforementioned networks. Insofar as the computers included in the data exchange can permit or run the data exchange themselves, a problem-free and control-free data exchange is advantageous and desirable. Usually, however, it is not desired that data on other computers be accessed from every other computer or that data be sent to one computer which this computer is not allowed to receive. In addition, to avoid superfluous data traffic, for example, for cost-related reasons or for reasons of the overloading of communications networks, it can make good sense to impede the exchange of data between individual computers.

To control the exchange of data, control mechanisms can be installed onto a computer at the interface with one of the aforementioned networks. This control mechanism can examine access to the computer as well as access from the computer to other computers and, if necessary, it can prevent such access. Such control mechanisms are characterized as firewalls. Such a firewall is usually inserted at an interface between different networks, for example between a LAN and a WAN. In addition, a computer that controls the data traffic between the networks is inserted at least on one side of the interface—in the example above usually on the LAN's side. The computer then controls the data traffic from or to the LAN and in this manner prevents foreign computers from accessing the computer connected to the LAN without permission, for instance, or it enables the computers on the LAN to communicate without permissions with communications partners outside the LAN.

In the simplest case, a firewall controls the messages exchanged between two communications partners only on the basis of the communications partners' addresses provided in the packets. Only when data traffic is allowed between these addresses will a message from one of these communications partners be forwarded to the other respective communications partner. More demanding implementations of a firewall go beyond the address and also test the respective information transported in the messages, i.e. the so-called application level or user data level of the messages. Such content-related examination of all messages is very costly, however, and demands very powerful computers as platforms for the firewall if the data traffic is not to be hindered by the control.

In the aforementioned examination it is assumed that a respective message to be examined is present in its entirety, i.e. that the message consists of a complete address section and complete user data section, for example, so that every message can be examined in itself. This is especially possible then, when a protocol from the family of so-called Internet Protocols (IP) is implemented for the transport of the message because then complete messages of varying lengths can be sent respectively, which are created dependent on the amount of information to be transported.

If larger amounts of data are to be sent, data will be segmented and distributed among various messages. On the basis of sequence IDs in the individual messages, the segmented data can be taken out of the messages in the correct order and returned to the original form. Such sequence IDs offer the Internet Protocol Transmission Control Protocol (TCP), for instance. Messages that are transmitted with the Transmission Control Protocol contain the control information from the TCP, the so-called TCP Header, as well as the control information from the IP, the so-called IP Header. By segmenting of the data into various messages, every message sent with the TCP Protocol also has complete control information, a so-called header, so that a firewall can search the named addresses in the header of every one of these messages and thereby determine if forwarding the respective message is allowed.

Especially in wide-area traffic, network protocols are often implemented in which the data packets are set at a prescribed length. A typical example are ATM networks that are being increasingly used in Wide Area Networks and more and more in Local Area Networks as well. The data packets used in ATM networks always have the same length and are called ATM cells. Now, if a message created with the assistance of an IP protocol is to be transmitted to an ATM network, this message, because of its length, must in many cases be distributed segmentally to many ATZ cells of an ATM cell sequence. The original message transported in these cells can be restored by means of the right IDs in the control portion of the ATM cells of the sequence. If such an ATM cell sequence is to be controlled by a firewall, then first the message contained in the cell sequence, e.g. the previously mentioned IP message, must be restored before an examination can determine whether this message is allowed to pass through the firewall or must be rejected. The ATM cell sequence can, if necessary, be sent further only beyond the firewall after this content-related examination. The speed of the data transfer is greatly diminished as a result of this.

SUMMARY OF THE INVENTION

An object of the invention is to control completed packet sequences before potential forwarding, by an efficient means.

This and other objects are accomplished by means of a process for the control of forwarding packets (C11A, C12A, C13A) from completed packet sequences of packet-switched networks, whereby information is transported segmentally within the packets of the packet sequences, and whereby at least the first packet (C11A) in each case, which is recognizable as the beginning of a packet sequence (C11A, C12A, C13A), characterized in that:

first, the permission to forward any packet is verified in that, at least whenever the respective packet belongs to the start of a packet sequence (C11A, C12A, C13A), the information transported in this packet is compared with at least one predetermined criterion, second, the first packet and, if necessary, the packet (C11A) along with the successive packets (C12A, C13A) of a packet sequence, are verified before forwarding up until the transported information has become sufficiently available so that it is comparable with the minimum one predetermined criterion, and, third, one packet (C11A) of a packet sequence will be forwarded only when it has been determined in the comparison that forwarding the packet is allowed, or when it has been determined by verifying a previous packet of the same packet sequence that forwarding is allowed for the packets of this packet sequence.

The object of the invention is further attained by a software module for the control of forwarding packets, and an interface, a terminal device and a server for this purpose.

With some of the commonly known packet filter techniques, only the initial packets that are sent for the construction of a communications relationship are examined by a firewall in order to improve the efficiency of the control and in order to determine if a communications relationship is, in itself, allowed. All further packets from this communications relationship then undergo only one simple address verification by the firewall, i.e. verification of the addresses given in the data packets. However, it is possible that, within the framework of a once-allowed communications relationship, sent information can be exchanged without verifications in the form of individual messages or in the form of message sequences. This can happen despite the fact that this data actually should not be exchanged. As explained below, the present invention does not leave open such security holes and allows for expeditious data traffic as well.

BRIEF DESCRIPTION OF THE DRAWING

In the following, the invention and its advantages will be presented on the basis of an example of its implementation with the assistance of illustrations.

DETAILED DESCRIPTION OF THE INVENTION

Figure 1:
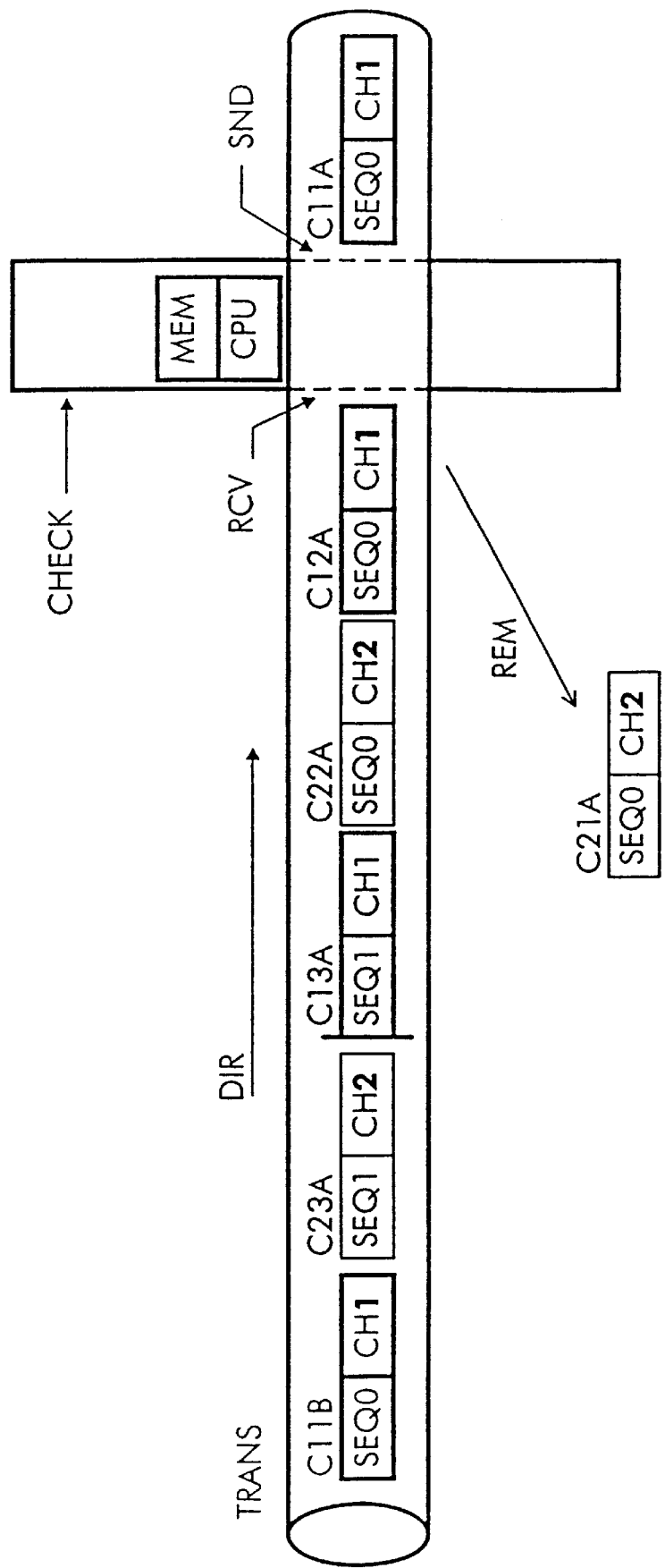
FIG. 1 shows an arrangement for the implementation of the process of the invention with a transfer path TRANS, with a control device CHECK, and with an initial packet sequence C11A, C12A, C13A, with a second packet sequence C21A, C22A, and C23A, and with a first packet C11B of a third packet sequence.

In FIG. 1 an arrangement is presented, on the basis of which the process of the invention can be illustrated efficiently. A transfer path TRANS, along which the data packets can be transferred, leads through a control device CHECK. The control device CHECK has an entry interface RCV to the transfer path TRANS, along which it can receive data packets from the transfer path TRANS and also has an exit interface SND, along which it can forward data packets via the transfer path TRANS. In FIG. 1 first the data packets C11A, C12A, and C13A which are transported along the transfer path TRANS, are named as example data packets which create a packet sequence. The transfer path TRANS can be a data line of an Ethernet network or also a data line of an ATM network. The control device CHECK receives a data packet in each case at the entry interface RCV, examines the data packet and determines, according to the result of the examination, whether or not the data packet can be sent further from the exit interface SND, i.e. can be forwarded via the transfer path TRANS, or whether it must be removed from the stream of data packets. As an example of such a removal of a data packet from the stream of data packets, a data packet C21A is shown in FIG. 1 which is no longer on the transfer path TRANS. The process of removal by the control device CHECK is highlighted by an arrow REM.

The control device CHECK can be an interface of a personal computer, with which the personal computer is connected to a network. Such an interface contains an entry interface RCV to the network, an exit interface SND to the personal computer, memory MEM and a controller CPU which can execute the programs saved in the memory. Within the control device CHECK the entry interface RCV the exit interface SND the memory MEM, and the controller CPU are connected with each other through connections not detailed in FIG. 1 for reasons of clarity.

The function of the named components of the control device CHECK will further be more closely described below.

It is also possible, however, that a terminal device carry out the functions of the control device CHECK. The entry interface RCV the exit interface SND the memory MEM and the controller CPU can be, e.g. components that are in a personal computer in any case.

On the transfer path TRANS, data packets are transferred in a flow direction shown by an arrow labeled DIR. Since the invention's process can be used in the flow direction DIR as well as analogously in the opposite direction, for simplification of the following, only the process in the flow direction DIR will be described. On the transfer path TRANS shown in FIG. 1, data can be transferred via various transfer channels. Such a transfer channel exists between a source not shown in FIG. 1 which sends data packets in the flow direction DIR and a target, also not shown, which receives data packets from the transfer path TRANS. If the transfer path TRANS is a data line of an Ethernet network, the control device CHECK can recognize such a transfer channel and a target address which is given in the data packets. If the transfer path TRANS is a data line of an ATM network, a transfer channel is defined as a so-called virtual channel and can be determined on the basis of a VPI/VCI-ID (Virtual Path Identifier/Virtual Channel Identifier) in the data packets. Also if, in an especially simple implementation form of the transfer path TRANS there are no different transfer channels, the invention's process can be used. As, however, in practice the transfer path TRANS is often a data line of an Ethernet network or an ATM network, the following will describe an implementation form with various transfer channels.

In FIG. 1, next to the already mentioned packet sequence C11A, C12A, and C13A, a second packet sequence C21A, C22A, and C23A is also presented. Only C11B is shown from a third data packet. The data packets can be assigned to one transfer channel, respectively, and on one such transfer channel, one packet sequence is assigned, respectively, in that one channel ID, CH1 or CH2, respectively, and one sequence ID, SEQ0 or SEQ1 is utilized, which is given in the data packets. The channel ID CH1 or CH2 can be a target address of an Internet Protocol (IP) or also a VPI/VCI ID of the usual protocol in ATM networks. The packet sequence C11A, C12A, and C13A and the packet sequence beginning with the data packet C11B are transferred via an initial transfer channel and therefore carry the same channel ID CH1. The packet sequence C21A, C22A, and C23A is assigned to a second transfer channel and is labeled with the channel ID CH2. On the basis of the sequence IDs SEQ0 and SEQ1, it can be determined whether the respective data packet marks the end of a packet sequence or not. Only the last data packet of a packet sequence carries the sequence ID SEQ1. In FIG. 1 such data packets are the data packets C13A and C23A. All other data packets of a packet sequence have the sequence ID SEQ0.

The control device CHECK examines the data packets transferred via TRANS and decides, according to the result of the examination, whether the data packets are to be forwarded along the transfer path TRANS or must be removed from the stream of the data packets. In addition, the control device CHECK first receives data packets at an entry interface RCV with the transfer path TRANS. The control device CHECK then assigns the respective data packet received to a packet sequence, by evaluating the channel IDs given in the data packet. In addition, the data packet is passed on, e.g. from the entry interface RCV to the memory MEM and is saved there so that the controller CPU can examine the data packet through execution of the programs mentioned. In FIG. 1 the data packet C12A is found directly before the entry interface RCV. The control device CHECK receives this data packet there and groups it, on the basis of channel ID CH1, first in a packet sequence on the initial transfer channel. The control device CHECK can determine, from the sequence ID SEQ0 that the data packet is not the final data packet of a packet sequence. Since the control device CHECK has already received a data packet from the packet sequence with the channel ID CH1 on the initial transfer channel earlier, namely the data packet C11A which was already forwarded along the transfer path TRANS by the control device CHECK, the control device CHECK assigns the data packet C12A to the packet sequence to which the data packet C11A also belongs. The data packet C11A which preceded the data packet C12A was already examined for content by the control device CHECK prior to forwarding along the transfer path TRANS, if it was allowable for the information transported in the data packet C11A, and thus for the data packet C11A, to be forwarded. The data packet C11A had survived this examination and was thus forwarded. Since the data packet C11A has already survived such a content based forwarding control and the control device CHECK recognized the data packet C12A as belonging to the data packet C11A, the control device CHECK can forward the data packet C12A without further examination. Thus, the controller CPU can take the data packet C12A from the memory MEM, again and forward it via the exit interface SND.

In a particularly simple form of a content verification of a data packet before forwarding, the control procedure CHECK can determine whether the target for which the data packet is destined is at all allowed to receive data packets. In addition, the control procedure CHECK compares the indicated target address, respectively, with a list of permissible target addresses, which can be stored in the memory MEM, in the respective data packet, and conducts the data packet onward only if the target address can be located in the list. Frequently, however, such simple verification is not sufficient so that the control procedure CHECK must examine the content of a data packet more precisely and compare this with further criteria. If the data packet to be forwarded contains an e-mail message, for instance, the control procedure CHECK can evaluate an indicated subject line in the e-mail and compare it with a list analogously to the verification of the target address already discussed above in which topics of a subject line that have been approved for forwarding are listed out. Similarly, the control procedure CHECK can combine several tests, e.g. verification of the target address and additionally verification of the subject line of an e-mail. Other verifications including incoming ones are possible as well, but they will not be further listed here.

The control procedure CHECK can also perform another task that is not depicted in FIG. 1 with respect to comparative verification. If the control procedure CHECK has been installed onto a personal computer in which, for instance, a program module suitable for such a comparative verification is present and can be run, then the control procedure CHECK can transmit contents of data packets that are to be verified to this program module. The program module then analyzes the content in the aforementioned fashion, and supplies the control procedure CHECK the result of the analysis whether the control procedure CHECK is allowed to further transmit the data packet or not.

It becomes clear only by way of the example of verification of the data packets C11A and C12A via the control procedure CHECK what an advantageous effect the invention has. Then, after the data packet C11A has stood up to close verification, the control procedure CHECK can forward the data packet C11A without any further content-related verification so that neither significant time delay before forwarding arises, and neither does the control procedure CHECK have to have access to an especially robust testing mechanism, e.g. an especially robust controller CPU, which is set up to enable content verification of all data packets to be tested by the control procedure CHECK before forwarding. Furthermore, it is often possible only to test the first data packet of a packet sequence because only in the first data packet is there any verifiable content to be transported. If the packet sequence C11A, C12A, and C13A contains a segmented e-mail, for example, and the mentioned subject line of the e-mail is indicated in the first data packet, data packet C11A, then the control procedure CHECK can verify this subject line only by using the first data packet C11A and thus can reach the decision to forward the message for the entire packet sequence C11A, C12A, and C13A.

In FIG. 1 the second packet sequence C21A, C22A, and C23A is further illustrated with a channel ID CH2 of the second transmission channel. The data packet C21A was verified previously by the control procedure CHECK with respect to forwarding. Because the content of the data packet C21A did not stand up to close verification, the data packet C21A was not forwarded by the control procedure CHECK but rather was removed from the stream of data packets on the transmission path TRANS and returned. Furthermore, the control procedure CHECK logged a message, correspondingly, into the memory MEM with which the return of the data packet C21A is saved. The procedure for returning the message is clarified by the arrow REM. If data packets C22A and C23A, which are still located on the transmission path TRANS headed in the direction of the control procedure CHECK, have reached the control procedure CHECK, the control procedure CHECK then assigns this data packet to the packet sequence started with the data packet C21A using the channel ID CH2 indicated in the data packets. Because the data packet C21A was already returned by the control procedure CHECK, however, the successive data packets C22A and C23A are also returned by the control procedure CHECK if the control procedure CHECK has received these data packets and assigned them finally to the packet sequence of the data packet C21A. The packet sequence C21A, C22A, and C23A can also be saved by the control procedure CHECK, e.g. within the memory MEM, so that it can still be determined at a later point in time, for instance, from which data source and with which data any unpermitted access to the target that is not illustrated in FIG. 1 of the packet sequence C21A, C22A, and C23A was attempted.

If it is not possible, however, to determine the forwarding authorization for the entire packet sequence using content verification of the first data packet of a packet sequence, then the control procedure CHECK can keep intermittently saving this first data packet and any other data packets that may follow into the memory MEM, as may be required, of the same packet sequence, until the contents of the data packets that are necessary for verification are sufficiently accessible to the control procedure CHECK. If, as in the example above of the segmented e-mail contained in the packet sequence C11A, C12A, and C13A, the subject line is divided between the first and second data packet C11A and C12A or is provided in the second data packet C12A instead in the first data packet C11A, then the control procedure CHECK saves the first data packet C11A of the packet sequence up until it has also received the second data packet C12A and the content of the data packets are altogether available for necessary verification. Only when the control procedure CHECK has reached a decision to forward the message after having received the second data packet C12A, it sends the data packet C11A and, finally, the data packet C12A, and later the data packet C13A, in the direction DIR onward. If the control procedure CHECK reaches a decision to return the packet sequence instead of forwarding it, it returns all data packets of this packet sequence.

If a complete packet sequence on one of the transmission channels has passed the control procedure CHECK or was returned by it, every successive packet sequence received by the control procedure CHECK on this transmission channel is retested again in the described fashion before being forwarded. In FIG. 1 the data packet C13A is the last data packet of the first packet sequence C11A, C12, and C3A. After receiving the data packet C13A, the control procedure CHECK can recognize from the sequence ID SEQ1 of the data packet C13A that the data packet C13A is the last data packet of its packet sequence. After this data packet has been received by the control procedure CHECK and finally, because it belongs to the first packet sequence that is to be forwarded, has been forwarded, the control procedure CHECK logs in its memory MEM that a packet sequence has been broken off on the first transmission path. If instead of the last data packet of a packet sequence, the first data packet had been specially identified, the control procedure CHECK would not need to log anything in its memory MEM but rather could recognize the first data packet as the first data packet of a packet sequence by using only the ID present in the first data packet, respectively, of a packet sequence.

If the control procedure CHECK receives a data packet again on the first channel, it will recognize this data packet as the first data packet of a new packet sequence and test this data packet for content before forwarding it. If the first data packet C11B of the third packet sequence then reaches the control procedure CHECK, the control procedure CHECK will examine its content, i.e. the control procedure CHECK will determine by way of the data packet C11B whether forwarding is allowed for the data packet C11B and for any other successive data packets of the third packet sequence. By way of this duplicate content verification of each packet sequence, we can prevent that all further data packets or packet sequences are forwarded without having been tested after forwarding an initial packet sequence or after forwarding only an initial data packet on a transmission channel, and thus possibly allowing any undesired forwarding of successive data packets. Insofar as the invention is distinct from known packet filtering techniques which then determine whether a connection established by initial data packets between two communications partners is allowed and then forward or return all successive data packets—each according to a result set forth in advance—between the communications partners without having been tested.

Figure 2:
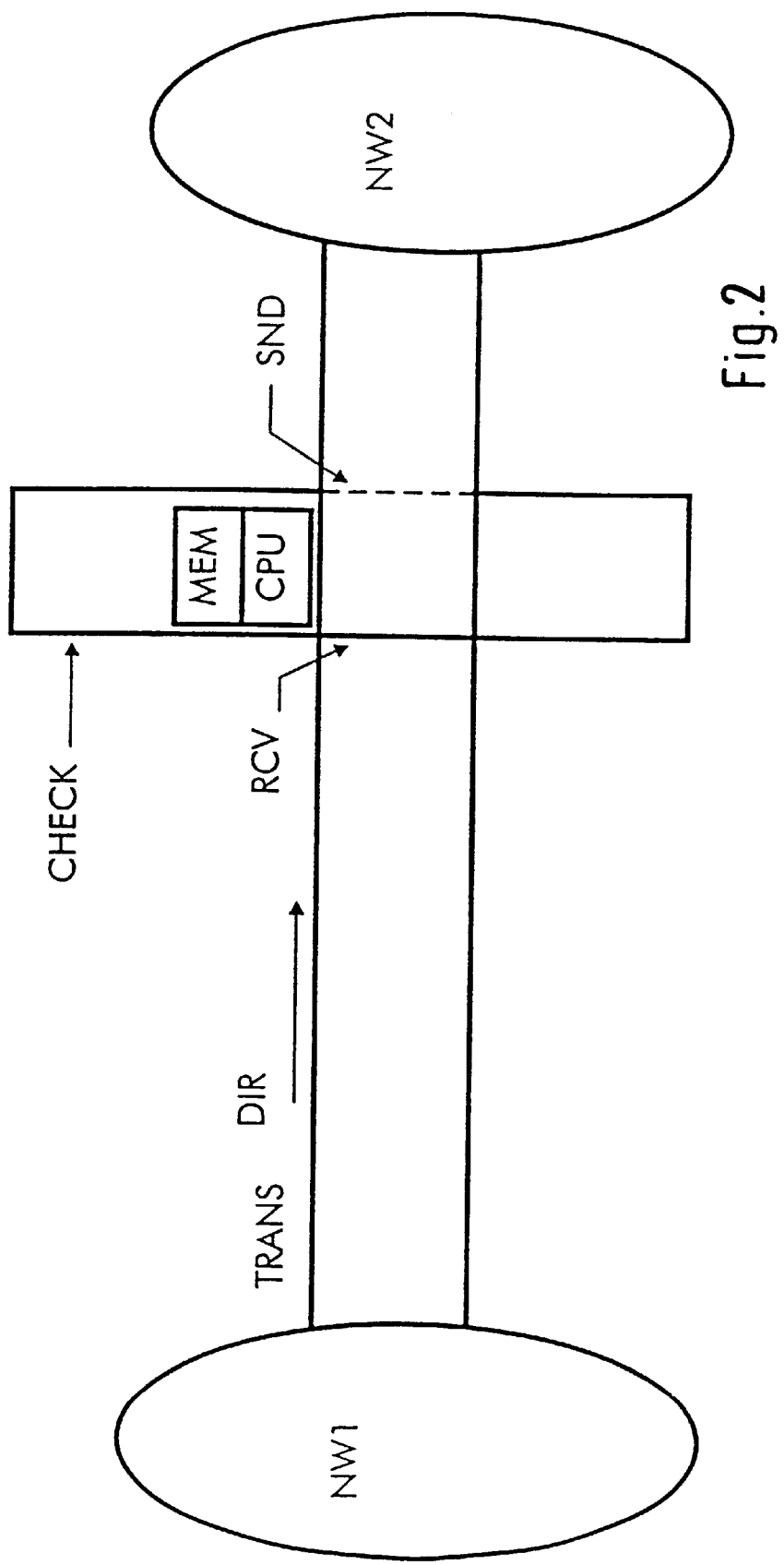
FIG. 2 shows an arrangement for the implementation of the process of the invention with a transfer path TRANS, with a control device CHECK, with an initial network NW1, and with a second network NW2.

FIG. 2 illustrates one assignment where the control procedure CHECK is an interface between two networks. The control procedure CHECK can be installed onto an interface server, for instance, which is connected between an initial network NW1 and a second network NW2. The interface server then tests the data traffic on the transmission path TRANS between the networks NW1 and NW2. Elements illustrated in FIG. 2 are provided for with the same reference signs as the elements already described in FIG. 1, insofar as the elements exhibit the same function. The server has access to an interface RCV to the part of the transmission path TRANS that leads to the network NW1 and a second interface SND to the part of the transmission path TRANS that leads to the network NW2. Like the connection module of a personal computer as previously described in connection with FIG. 1, the server also contains a memory MEM and a controller CPU that can execute save programs within the memory.

A software module consistent with the invention can also be implemented, however, which nonetheless has access to a memory MEM, a controller CPU, an input interface RCV, and an output interface SND and, as illustrated in FIG. 2, is connected between two networks NW1 and NW2. Such a software module is saved in the memory MEM and execute by the controller CPU. Data packets to be verified are received by the input interface RCV of the server and directed as input data to the software module running on the controller CPU. The software module verifies the respective data packet in the fashion already described. According to each test result, the software module throws the data packet out or returns it to the server so that it can be issued to an output interface SND of the server.

The invention has a particularly advantageous effect if the data packets of a packet sequence to be tested with the assistance of an initial protocol are transmitted and if one message in the data packets of one packet sequence is transported in a second protocol segmentally. This is the case, for instance, if the transmission path TRANS is a data line of an ATM network, if the data packets are transmitted accordingly on the transmission path TRANS in an ATM protocol, and if segmented messages are contained in the data packets of one packet sequence which are composed, for example, with a protocol from the family of Internet protocols (IP). Because messages are typically transmitted in so-called Local Area Networks (LAN) with the assistance of Internet protocols and because ATM networks are frequently implemented in broad traffic, e.g. in Wide Area Networks (WAN), an IP message has to be divided during a transmission from a LAN into the WAN into a sequence of ATM data packets—a so-called ATM cell sequence, insofar as the IP message does not find a location in any ATM cell. Data packets in ATM networks are called "cells" because they always exhibit the same size. Precisely for this reason it is often necessary to separate IP messages, which have a largely freely determinable size that goes beyond the transportable user data portion within an individual ATM cell, into several ATM cells from ATM cell sequences, respectively. The control procedure CHECK can assign to one channel a respective ATM cell using a VPI/VCI ID (Virtual Path Identifier/Virtual Channel Identifier) indicated in the control portion of ATM cells corresponding to the channel IDs CH1 and CH2 in FIG. 1. The control procedure CHECK can group ATM cells received on one channel with the assistance of a sequence ID used analogously to the sequence ID SEQ0 and SEQ1 termed "AUU" into ATM cell sequences. If in one ATM cell sequence an IP message is transported, then in the first cell of this sequence of the control portion of the IP message, the so-called IP header, is contained. The control procedure CHECK usually can decide by examining the IP header transported in this first cell whether the ATM cell sequence may be forwarded or not. In addition, the control procedure CHECK examines, for example, the target address indicated in the IP header, and possibly also any source address that may be indicated and further information of a TCP header (Transmission Control Protocol) attached to the IP header, and determines the forwardability of the IP message by comparing it with previously provided values saved in the memory MEM and thus also the forwardability of the total ATM cell sequence. After verification of this initial cell, the control procedure CHECK has to assign all successive cells belonging to the affected ATM cell sequence solely to this cell sequence and can throw out or forward these cells according to each result of the verification of the initial cell.

A similar division of messages into several carrier telegrams such as the division of IP messages into ATM cell sequences is also undertaken during transmission of messages between supercomputers and terminals, e.g. during transmission with the assistance of carrier telegrams of the supercomputer protocol SNA (System Network Architecture), which is used by supercomputers from the IBM corporation. Here as well, the control procedure CHECK in the efficient fashion described above transmits sequences of carrier telegrams and has to verify only the first carrier telegram of a sequence before possibly forwarding any content.

What is claimed is:

1. A process for control of forwarding packets from completed packet sequences of packet-switched networks and at least a first packet being recognizable as the beinning of a packet sequence, said method comprising the steps of:

verifying permission to forward any of said packets such that, when the respective packet belongs to a start of the packet sequence, information transported in the packet is compared with at least one predetermnued citerion;

verifying the first packet and, when necessary, successive packets of the packet sequence, before forwarding and until the transported information has become sufficiently available so that it is comparable with the at least one predetermined criterion; and forwarding one of said packets of a packet sequence only when it has been determined that forwarding the one packet is allowed by said comparison when only said first packet is verified, and when said successive packets are also verified by verifying a previous packet of the same packet sequence, for the packets of the packet sequence, wherein said information is transported segmentally within the packets of the packet sequences.

2. The process according to claim 1, characterized in that, the respective packets of a packet sequence are transferred with the assistance of an initial protocol that shows an initial control portion, a segmented message is transported in a second protocol with at least a second control portion, whether a respective packet belongs to a packet sequence is determined by evaluating the initial control portion, and once the information transported in the packet is compared with the minimum one predetermined criterion, the information will be evaluated with the comparison of the second control portion.

3. The process according to claim 1, characterized in that the process is used on packets from an ATM network.

4. The process according to claim 1, characterized in that the process is used on packets from an Internet protocol.

5. A software module for the control of forwarding packets from completed packet sequences of packet-switched networks and at least the first packet in each case being recognizable as the beginning of a packet sequence, said software module being contained in a computer-readable medium to perform the following steps:

verifying the permission to forward any packet in that, when the respective packet belongs to the start of a packet sequence, the information transported in this packet is compared with at least one predetermined criterion;

verifying the first packet and, when necessary, successive packets of a packet sequence, are verified before forwarding until the transported information has become sufficiently available to be comparable with the minimum one predetermined criterion; and forwarding one packet of a packet sequence only when the comparison has resulted in a determination that forwarding the packet is allowed said comparison when only said first packet is verified, and when said successive packets are also verfied be verifying a previous packet of the same packet sequence has resulted in a determination that forwarding is allowed for the packets of this packet sequence, wherein said information is transported segmentally within the packets of the packet sequencs.

6. An interface for the control of forwarding packets from completed packet sequences of packet-switched networks and at least a first packet in each case, being recognizable as the beginning of a packet sequence, said interface being characterized in that, the permissions to forward any packet is verified in that, at least whenever the respective packet belongs to the start of a packet sequence, the information transported in this packet is compared with at least one predetermined criterion;

that the first packet and, when necessary, successive packets of a packet sequence, are verified before forwarding up until the transported information has become sufficiently available so that it is comparable with the minimum one predetermined criterion; and that one packet of a packet sequence will be forwarded only when it has been determined in the comparison for the first packet that forwarding the packet is allowed when only said first packet is verified, and when said successive packets are also verified by verifying a previous packet of the same packet sequence that forwarding is allowed for the packets of this packet sequence, wherein said information is transported segmentally within the packets of the packets sequences.

7. A terminal device for the control of forwarding packets from completed packet sequences of packet-switched networks and at least a first packet being recognizable as the beginning of a packet sequence, said terminal device characterized in that, the permissions to forward any packet is verified in that, at least whenever the respective packet belongs to the start of a packet sequence, the information transported in this packet is compared with at least one predetermined criterion;

the first packet and, when necessary, successive packets of a packet sequence, are verified before forwarding up until the transported information has become sufficiently available so that it is comparable with the minimum one predetermined criterion; and one packet of a packet sequence will be forwarded only when it has been determined in the comparison for the first packet that forwarding the packet is allowed when only said first packet has been verified, and when said successive packets are also verified by verifying a previous packet of the same packet sequence that forwarding is allowed for the packets of this packet sequence, wherein said information is transported segmentally within the packets of the packet sequences.

8. A server for the control of forwarding packets from completed packet sequences of packet-switched networks and at least the first packet being recognizable as the beginning of a packet sequence, said server being characterized in that, the permissions to forward any packet is verified in that, at least whenever the respective packet belongs to the start of a packet sequence, the information transported in this packet is compared with at least one predetermined criterion;

the first packet and, when necessary, successive packets of a packet sequence, are verified before forwarding up until the transported information has become sufficiently available so that it is comparable with the minimum one predetermined criterion; and one packet of a packet sequence will be forwarded only when it has been determined in the compassion for the first packet that forwarding the packet is allowed when only said first packet is verified, and when said successive packets are also verified by verifying a previous packet of the same packet sequence that forwarding is allowed for the packets of this packet sequence, wherein said information is transported segmentally within the packets of the packet sequences.

\* \* \* \* \*